Feb. 15, 1966       R. O. WHITAKER          3,234,931
                  SOLAR ENERGY ABSORBER
Filed Feb. 20, 1963                    2 Sheets-Sheet 1

INVENTOR.
Ronald O. Whitaker
BY
E. W. Christen
ATTORNEY

Feb. 15, 1966  R. O. WHITAKER  3,234,931
SOLAR ENERGY ABSORBER
Filed Feb. 20, 1963  2 Sheets-Sheet 2

INVENTOR.
Ronald O. Whitaker
BY
E. W. Christen
ATTORNEY

United States Patent Office 3,234,931
Patented Feb. 15, 1966

3,234,931
SOLAR ENERGY ABSORBER
Ranald O. Whitaker, Indianapolis, Ind., assignor to General Motors Corporation, Detroit, Mich., a corporation of Delaware
Filed Feb. 20, 1963, Ser. No. 259,900
2 Claims. (Cl. 126—270)

This invention relates to solar power plants and, more specifically, it relates to that portion thereof known as an absorber and whose purpose is to convert solar radiant energy into thermal energy.

Space travel has brought with it a need for devices to efficiently convert solar power into electrical or mechanical power. Since no other source of power is present in outer space, the need is quite urgent. Such devices are also useful in earth applications. As a result much effort is today being directed toward the development of an absorber which will efficiently convert solar radiation to thermal energy.

Absorbers of conventional design generally suffer losses between 5% and 50%. It is desirable to minimize such losses.

It is, therefore, an object of this invention to eliminate a significant portion of the losses associated with previous absorbers by providing an absorber having a specially designed reflecting surface which reduces both reflected losses and reradiation losses.

It is a further object of the present invention to provide an absorber capable of attaining a higher equilibrium temperature than can be attained by an absorber of conventional design.

In general, then, this invention relates to a solar radiation absorber which will efficiently absorb a high percentage of the solar rays which it receives. The absorber features curved side reflecting walls that cause almost all of the rays which enter from the concentrator to remain within the absorber.

Other objects, features and advantages of the percent invention will become apparent upon reference to the succeeding detailed description and the drawings illustrating the preferred embodiments thereof, wherein.

Figure 1:
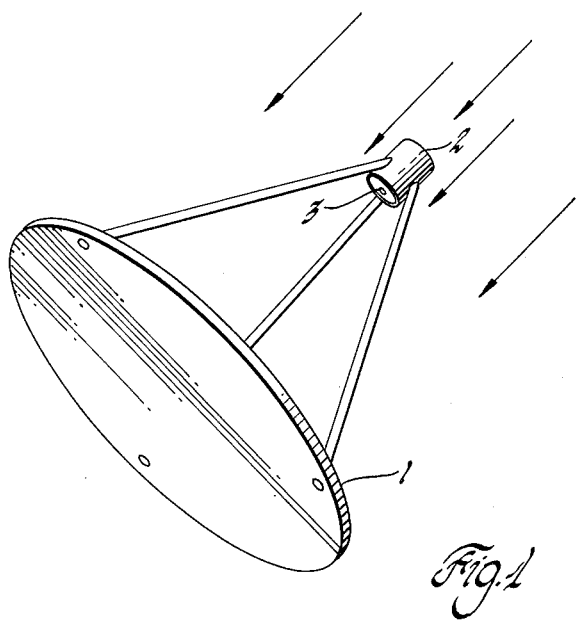
FIGURE 1 is a typical thermionic solar converter system.

More specifically, FIGURE 1 shows a thermionic solar converter system having a Fresnel mirror 1, and a converter 2 with an absorbing mouth 3. As seen in the figure the rays are reflected by the mirror 1 and concentrated towards the converter 2, and passed therein through the absorber mouth 3. Inside the absorber the radiation may be converted from radiant energy to electrical energy in known fashion by a series of thermo-electrical energy plates in the absorber surface. Alternatively, the absorber surface can be the outer wall of a heat accumulator for a heat engine which in turn can be used to power an electric generator.

It is characteristic of all absorbers that four types of losses occur in the conversion of the radiant energy to thermal energy at the absorber surface. The first loss occurs when incoming rays are directly reflected from the absorber surface back through the absorber mouth. The second loss occurs when rays are reflected from the absorber surface to the side walls or upper reflecting surfaces of the converter and then out the absorber mouth. The third loss occurs when reradiation from the hot absorber surface passes directly out the absorber mouth. The fourth loss occurs when reradiation from the hot absorber surface strikes the walls and is reflected therefrom out the absorber mouth. In this invention we are most concerned with the second and fourth type losses, hereafter called container reflection losses.

Figure 2:
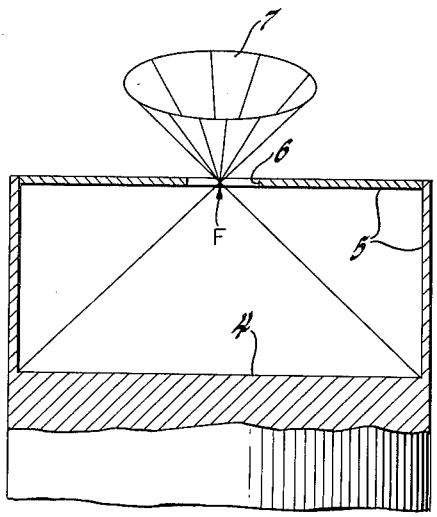
FIGURE 2 is a conventional absorber for such system.

A conventional absorber system is shown in FIGURE 2. It has an absorber surface 4 and reflecting surfaces 5. The solar rays are focused by the mirror 1 so that the focal point F occurs at the absorber mouth 6. This focusing of the rays produces a cone of incident radiation 7 which, in effect, defines the scope of rays which are received by the absorber from the mirror. It can be seen that first and third losses noted above will occur in an absorber of this type, or in any type that has an opening in its upper surface. It also can be seen, due to the laws of reflection, wherein the angle of incidence equals the angle of reflection at a reflecting surface, that the absorber is subject to container reflection losses. This is because successive reflections between the side walls, upper walls and absorber surface will eventually allow some rays to escape out the mouth 6.

Figure 3:
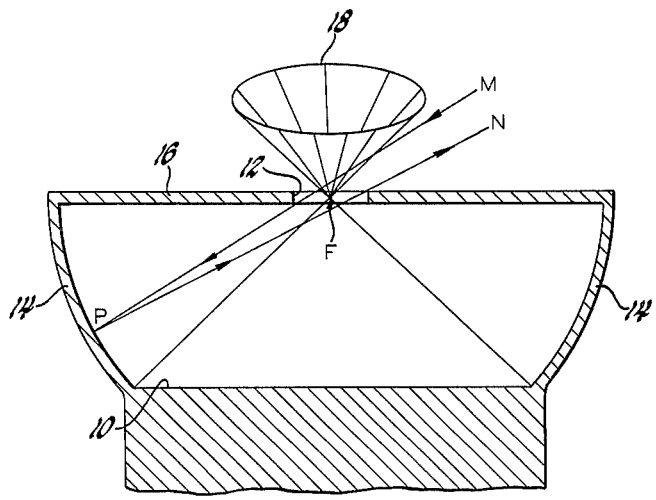
FIGURE 3 is the basis of the present invention, a saucer absorber.

The basic design of the present invention, a saucer absorber, is shown in FIGURE 3. The saucer absorber is similar to the conventional absorber of FIGURE 2 in that the absorber surface 10 is considerably larger than the absorber mouth 12. But the configuration of the side reflecting walls is changed, and herein lies the substance of the invention. The curved side wall 14 is constructed such that it is a segment of a sphere having its center at the center of the absorber mouth 12. Thus it can be seen that the absorber is a segment of a sphere with the upper surface 16 corresponding to a plane cut through the center of the sphere and the absorber surface a plane parallel thereto.

The mirror 1 is arranged to concentrate the rays into an incident cone of radiation 18 with its focal point F occurring at the spherical center, that is, the center of the absorber mouth 12.

The absorber is designed to eliminate the container reflection losses discussed before. From the laws of reflection, the angle of incidence is equal to the angle of reflection, and with a curved surface such angle are determined by the normal to the tangent to the curved surface at the point of contact. For the side walls 14, this normal is always a radius.

For the type of loss under consdieration, we are concerned with the side walls only, for the upper walls 16 obviously can not reflect directly out the mouth 12.

Consider hypothetical ray N emanating from point P of the curved surface and emerging from the absorber mouth as indicated in FIGURE 3. By the laws of reflection hypothetical ray N can have resulted only from hypothetical ray M incident upon point P and emanating from some point outside the absorber. Hypothetical ray N cannot have resulted from any ray incident at point P and coming from any of the other surfaces of the absorber. Since in the solar converter application essentially no radiation enters the absorber mouth from the direction indicated by ray N, it follows that no radiation can escape from the absorber if that radiation comes any portion of the absorber curved surface.

It follows that no ray emanating from absorber surface 10 can by any combination of reflection from surfaces 14 and 16 be redirected so as to emerge from absorber mouth 12. Radiation emanating from absorber surface 10 and not immediately passing through absorber mouth 12, must eventually return to absorber surface 10. The invention eliminates container reflection losses.

The maximum temperature attainable by the absorber is that for which the radiant power emanating from the absorber is equal to the radiant power entering the absorber. The former is a function of the absorber surface temperature and the configuration of the absorber. As temperature rises, emergent radiant power rises. The power entering the absorber is fixed by mirror performance and absorber mouth diameter. It follows that the reduced reflected radiation and the reduced reradiation from the saucer absorber permit a higher temperature to be attained than can be attained by an absorber of conventional design.

However, perfectly specularly reflecting surfaces, as assumed in the discussion of the saucer absorber of FIGURE 3, have not yet been obtained. The side wall surfaces will always have a finite absorptance and emittance as well as surface irregularity. Solar converters operate at high temperatures, such as 1500° K. It is known that most metallic surfaces tend to become black as temperatures rise, therefore, their reflective characteristics will decrease, and as a consequence considerable heat can escape from the subject absorber through the absorber mouth as the side walls act as radiators.

Figure 4:
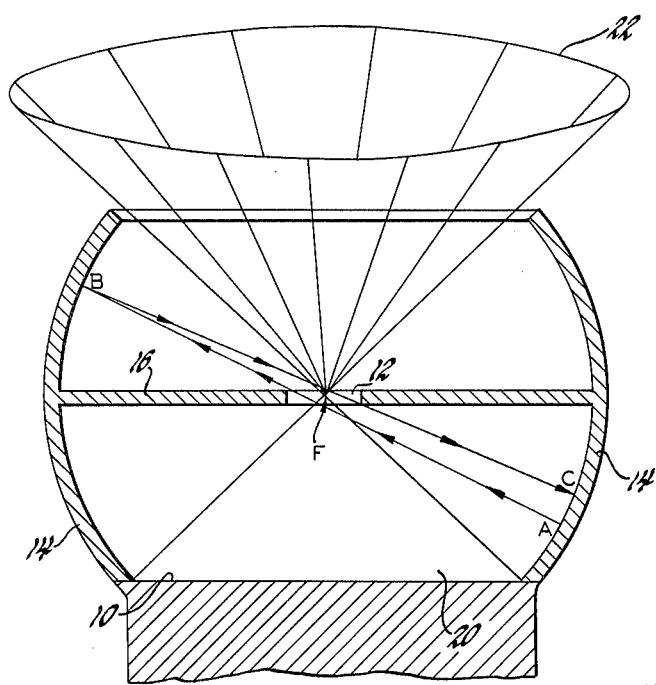
FIGURE 4 is an adaptation of the present invention, a bowl absorber.

To reduce loss due to irregularities in the reflection characteristics of the side walls, the absorber may be modified as indicated in FIGURE 4. This absorber takes on a bowl shape as the curved walls 14 are extended a like distance above the surface 16. Thus the absorber in FIGURE 4 is a spherical segment twice as large as that of the saucer design in FIGURE 3 and it also has its spherical center positioned at the center of the absorber mouth 12. As seen in FIGURE 4, the side walls are extended such that the only rays entering the absorber will come from the incident cone of radiation 22.

As seen in FIGURE 4, if a ray emanating from the point A were to escape through the absorber mouth 12 it would strike the upper portion of the curved wall at point B and thereafter be reflected back through the absorber mouth to point C. A perfect second reflection would take the radiation back out the absorber mouth 12. Reflection would continue until the energy of the ray is completely absorbed by the small yet finite absorptance of the two surfaces. Therefore, it is seen that the extension of the curved walls 14 above the focal plane surface 16 causes some of the radiation which would escape due to imperfections in the lower portion of the side reflecting walls to be returned to the absorber cavity 20.

The radius defining the inner curved wall is determined by the size of the absorber and the optics of the mirror. The specific mirror optics determine the cone angle of the incident radiation. The size of the absorber surface is determined by the type of converter and the thermal characteristics desired.

The radius defining the outer curved wall may be arbitrarily selected. It may be larger or smaller than the radius of the inner wall. A larger radius tends to increase the effectiveness of the absorber a slight amount. The increase is due to imperfections in the mirror and to the finite angle subtended by the sun. However, increasing the radius causes increased blockage of the mirror and causes the mass of the system to increase. Both are undesirable.

Although the present invention has been mentioned in conjunction with its use in space type solar converters, it should be obvious to those skilled in the art to which the invention pertains that it would have equally advantageous use in earthbound power plants, and that many modifications and changes may be made thereto without departing from the scope of the invention.

I claim:
1. In a system for absorbing radiant energy from a concentrator which focuses radiant energy upon a focal plane, an energy converter comprising an enclosure for receiving and absorbing the radiant energy and having a highly reflective inside upper surface lying in the focal plane with a small opening in its center at the focal point, said opening permitting the passage of the focused radiant energy from the concentrator into said enclosure, a lower absorber surface parallel to the focal plane and upon which the radiation impinges, and a highly reflective curved wall forming a segment of a sphere whose center coincides with the center of said opening, said upper and lower surfaces forming upper and lower bases for said segment.

2. In a system for absorbing radiant energy from a concentrator which focuses radiant energy upon a focal plane thereby forming a cone of incident radiation, an energy converter comprising an enclosure for receiving and absorbing the radiant energy and having a highly reflective inside upper surface lying in the focal plane with a small opening in its center at the focal point, said opening permitting the passage of the focused radiant energy from the concentrator into said enclosure, an absorber lower surface parallel to the focal plane and upon which the radiation impinges, a highly reflective curved wall which is a lower segment of a sphere whose center coincides with the center of said opening, said curved wall intercepting said radiant energy absorber surface and said focal plane reflective surface at the extremities thereof, and a second highly reflective curved wall which is an upper segment of a sphere also having its center at the center of said opening and terminated on one base by said focal plane surface and on the other base by an opening defined by the size of the cone of incident radiation coming from the concentrator, said converter through the configuration of its reflective surfaces and their above defined relation to the absorber surface substantially eliminating container reflection losses.

References Cited by the Examiner

UNITED STATES PATENTS

| 1,599,481 | 9/1926 | Marcuse | 126—271 |
| 1,661,473 | 3/1928 | Goddard et al. | 126—271 |
| 2,552,237 | 5/1951 | Trombe | 126—271 |
| 3,029,596 | 4/1962 | Hanold et al. | 126—270 X |
| 3,085,565 | 4/1963 | Macauley | 126—270 |

FOREIGN PATENTS

| 146,820 | 5/1921 | Great Britain. |

FREDERICK L. MATTESON, Jr., *Primary Examiner.*

JAMES W. WESTHAVER, PERCY L. PATRICK,
*Examiners.*